United States Patent
Schlueter

(10) Patent No.: US 9,435,920 B2
(45) Date of Patent: Sep. 6, 2016

(54) ILLUMINATION SYSTEM

(71) Applicant: Schluter Systems L.P., Plattsburgh, NY (US)

(72) Inventor: Werner Schlueter, Iserlohn (DE)

(73) Assignee: Schluter Systems L.P., Plattsburgh, NY (US)

( * ) Notice: Subject to any disclaimer, the term of this patent is extended or adjusted under 35 U.S.C. 154(b) by 332 days.

(21) Appl. No.: 14/152,024

(22) Filed: Jan. 10, 2014

(65) Prior Publication Data

US 2014/0198488 A1    Jul. 17, 2014

(30) Foreign Application Priority Data

Jan. 11, 2013   (DE) .................... 20 2013 100 145 U

(51) Int. Cl.
| | |
|---|---|
| *G02B 5/08* | (2006.01) |
| *F21V 33/00* | (2006.01) |
| *F21V 15/01* | (2006.01) |
| *F21V 19/00* | (2006.01) |
| *F21W 131/302* | (2006.01) |
| *F21Y 101/02* | (2006.01) |
| *F21Y 103/00* | (2016.01) |

(52) U.S. Cl.
CPC ............... *G02B 5/08* (2013.01); *F21V 15/013* (2013.01); *F21V 33/004* (2013.01); *F21V 19/005* (2013.01); *F21W 2131/302* (2013.01); *F21Y 2101/02* (2013.01); *F21Y 2103/003* (2013.01)

(58) Field of Classification Search
CPC ...... G02B 5/08; F21V 15/013; F21V 33/004
See application file for complete search history.

(56) References Cited

U.S. PATENT DOCUMENTS

| | | | |
|---|---|---|---|
| 1,930,244 A | 10/1933 | Lewinsohn et al. | |
| 1,984,355 A | 12/1934 | Abbott | |
| 2,947,093 A | 8/1960 | Masters | |
| 3,667,177 A | 6/1972 | Biela | |
| 4,394,714 A | 7/1983 | Rote | |
| 5,140,506 A | 8/1992 | Katz | |
| 5,165,780 A | 11/1992 | Katz | |
| 5,243,799 A | 9/1993 | Schluter | |

(Continued)

FOREIGN PATENT DOCUMENTS

| | | |
|---|---|---|
| AT | 511 325 A4 | 11/2012 |
| CN | 102197933 A | 9/2011 |

(Continued)

OTHER PUBLICATIONS

German Search Report dated Nov. 6, 2013 in German Application No. 20 2013 100 145.7 with English translation of relevant parts.

(Continued)

*Primary Examiner* — David V Bruce
(74) *Attorney, Agent, or Firm* — Thorpe North & Western

(57) ABSTRACT

An illumination system for defining and lighting around an object positioned on a base such as for example a mirror, includes at least one elongate profile that has a fastening section and a limitation section extending transversely, in particular perpendicularly to the latter, and at least one illuminant that is fastened or can be fastened to the top of the fastening section of the profile a distance away from the limitation section and is formed and positioned such that, in the correctly arranged state, it emits light in the direction of the limitation section.

19 Claims, 2 Drawing Sheets

(56) References Cited

U.S. PATENT DOCUMENTS

| | | |
|---|---|---|
| 5,336,849 A | 8/1994 | Whitney |
| 5,514,834 A | 5/1996 | Zimmerman |
| 5,732,747 A | 3/1998 | Holliday |
| 5,775,016 A | 7/1998 | Chien |
| 6,345,480 B1 | 2/2002 | Kemper et al. |
| 6,401,418 B1 | 6/2002 | Senn et al. |
| 6,591,575 B2 | 7/2003 | Benedettini |
| 6,727,434 B2 | 4/2004 | Jadaud et al. |
| 6,745,534 B2 | 6/2004 | Kornfalt |
| 6,755,550 B1 | 6/2004 | Lackey |
| 6,911,597 B2 | 6/2005 | Seamans et al. |
| 6,972,637 B2 | 12/2005 | Nation |
| 6,990,776 B2 | 1/2006 | Berman |
| 7,060,893 B1 | 6/2006 | Villi |
| 7,388,163 B2 | 6/2008 | VanderVelde et al. |
| 8,197,105 B2 | 6/2012 | Yang |
| 2003/0029125 A1 | 2/2003 | Salice |
| 2005/0286247 A1 | 12/2005 | Peterson |
| 2006/0185295 A1 | 8/2006 | Gardner |
| 2007/0290475 A1 | 12/2007 | Reitinger |
| 2008/0066419 A1 | 3/2008 | Stanchfield et al. |
| 2011/0058353 A1* | 3/2011 | Yang ............... A47F 3/001 362/84 |
| 2011/0183153 A1 | 7/2011 | Schlueter |

FOREIGN PATENT DOCUMENTS

| | | |
|---|---|---|
| DE | 8807329 U1 | 10/1989 |
| DE | 297 09 378 U1 | 7/1997 |
| DE | 297 11 074 U1 | 7/1998 |
| DE | 202 12 950 U1 | 12/2003 |
| DE | 20 2007 011 342 U1 | 11/2007 |
| DE | 20 2009 001 162 U1 | 4/2009 |
| DE | 10 2008 056 958 A1 | 5/2010 |
| DE | 20 2010 005 347 U1 | 8/2010 |
| DE | 20 2011 104 306 U1 | 10/2011 |
| EP | 2327340 A1 | 6/2011 |
| FR | 2 803 367 A1 | 7/2001 |
| FR | 2953703 A1 | 6/2011 |
| WO | WO 2008/125183 A1 | 10/2008 |
| WO | 2011/151272 A1 | 12/2011 |
| WO | 2012/056029 A1 | 5/2012 |

OTHER PUBLICATIONS

German Search Report dated Dec. 19, 2013 in German Application No. 20 2013 100 141.4 with English translation of relevant parts.

* cited by examiner

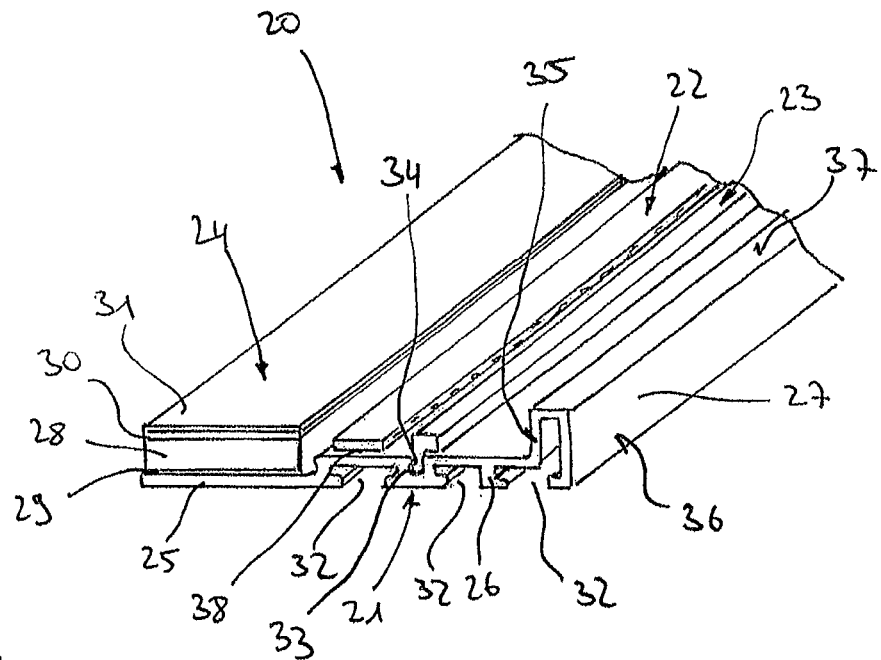
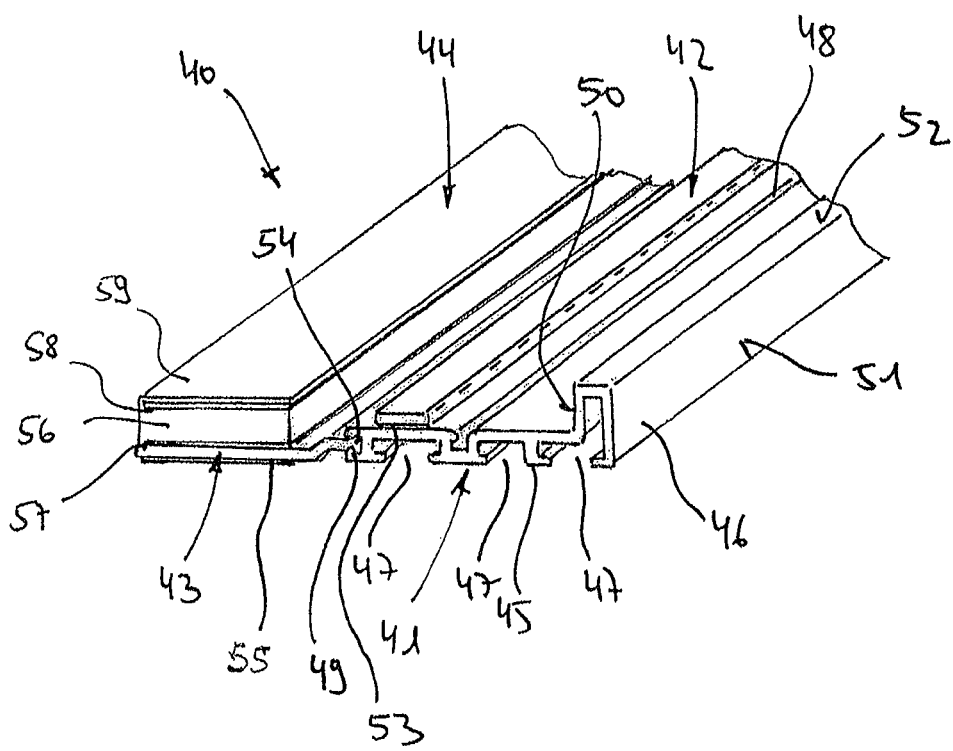

ILLUMINATION SYSTEM

CROSS REFERENCE TO RELATED APPLICATIONS

Applicant claims priority under 35 U.S.C. §119 of German Application No. 20 2013 100 145.7 filed Jan. 11, 2013, the disclosure of which is incorporated by reference.

BACKGROUND OF THE INVENTION

1. Field of the Invention

The present invention relates to an illumination system for defining and lighting around an object positioned on a base, such as for example a mirror that is fastened to a wall.

2. Description of the Related Art

Illumination systems of the specified type are known in a wide range of configurations in the prior art. In the simplest case, for example, an LED strip can be positioned adjacent to an object positioned on a base, by means of which said object is automatically defined and provided with all-round lighting.

SUMMARY OF THE INVENTION

On the basis of this prior art it is an object of the present invention to provide an alternative illumination system for the aforementioned purpose.

In order to achieve this object the present invention provides an illumination system of the type specified at the start comprising at least one elongate profile that has a fastening section and a limitation section extending transversely, in particular perpendicularly to the latter, and at least one illuminant that is fastened or can be fastened to the top of the fastening section of the profile a distance away from the limitation section and is formed and positioned such that, in the correctly arranged state, it emits light in the direction of the limitation section.

In order to define and light around an object positioned on a base, in a first step the illumination system is fastened to a base. In a second step the object is applied to the base such that it is positioned adjacent to the illumination system and covers the illuminant positioned on the top of the fastening section of the profile. Correspondingly, the object is visually surrounded by the profile of the illumination system and defined in the manner of a frame. Moreover, the object is provided with all-round and back lighting by the illuminant positioned on the profile. Since in the correctly arranged state the illuminant is covered by the object, indirect illumination is produced by illuminating the limitation section with light, and this gives a very pleasant appearance.

The profile is preferably an extruded profile with a cross-section that remains the same over the entire length. It is an advantage of extruded profiles that they are easy and inexpensive to produce.

The profile is advantageously produced from aluminum or stainless steel. Aluminum and stainless steel not only have a visually very attractive appearance, but in addition they are resistant to corrosion, and so the illumination system can also be used in wet rooms, such as for example in bathrooms or the like. Preferably, the profile has a surface with a matte appearance. Since in the illumination system according to the invention the limitation section of the profile is illuminated directly by the illuminant, by virtue of this matte surface reflections which are bothersome to the eye are avoided.

According to one configuration of the present invention the fastening section of the profile is provided on its bottom with at least one undercut cavity. This undercut cavity serves to receive connection elements for the fixing of the joint areas of two adjacent profiles which are arranged flush or at an angle to one another. Furthermore, the undercut cavity serves to anchor with a pasty adhesive, such as for example tile adhesive, so that the profile can be fastened without any problem to the base with a corresponding adhesive. This is particularly advantageous if an object is, for example, to be integrated into a tiled wall where the tiles are also fixed by tile adhesive. Correspondingly, the fastening of the profile of the illumination system according to the invention can be easily incorporated into the tiler's work. Alternatively or in addition, there can also be fastened to the bottom of the fastening section at least one fabric or fleece which is designed such that it provides an adhesive base for an adhesive, such as for example a tile adhesive.

According to one configuration of the present invention the limitation section of the profile has side walls lying opposite one another which are connected to one another by a connection wall, in the correctly arranged state the outer surface of the connection wall forming a visible decorative surface. In this way a wide decorative surface can be achieved with limited material usage.

The illuminant is preferably elongate in form, in particular in the form of a strip or a chain with a plurality of LEDs arranged over the latter.

Preferably the illuminant is fastened or can be fastened to the top of the fastening section using at least one adhesive strip. This produces a simple and inexpensive structure.

According to one configuration of the present invention the illumination system comprises an elongate diffusion disc element that, in the correctly arranged state of the illumination system, can be fixed to the top of the fastening section between the illuminant and the limitation section. The diffusion disc element serves to diffuse the light emitted by the illuminant so as in this way to achieve even illumination.

The diffusion disc element is preferably fixed to the fastening section by a manually releaseable snap-on connection so that the diffusion disc element can be optionally positioned or removed.

According to one configuration the illumination system according to the invention has spacing means which are designed such that they position the object to be defined and provided with all-round lighting in the correctly arranged state such that the object at least partially covers the fastening section of the profile.

The spacing means advantageously comprise at least one magnet and at least one metal plate that can be fixed to the latter magnetically. In the correctly arranged state the magnet is fastened by a first fastening means, such as for example an adhesive strip that is adhesive on both sides, to a base or to the profile, while the metal plate is fixed by a second fastening means which can also be an adhesive strip that is adhesive on both sides, to the object to be defined and provided with all-round lighting. In this way releaseable fastening of the object to the base or to the profile is achieved.

As already described above, the illumination system according to the invention is preferably used to define and back light an object positioned on a base, such as for example a mirror fastened to a wall. For this purpose, in a first step, the illumination system is fastened to a base, whereupon, in a second step, the object is fixed to the base such that the object is positioned adjacent to the illumination system and covers the illuminant positioned on the top of the fastening section.

Preferably, at least one spacing means is positioned between the object and the base, by means of which the space required to cover the illuminant held on the profile is provided.

Advantageously the profile of the illumination system is stuck to the base, in particular using a tile adhesive, as already described above.

If the profile of the illumination system is positioned adjacent to a tile covering, the tile covering is also defined by the profile, in fact by the limitation section. Advantageously the height of the limitation section then terminates substantially flush with the tile covering.

BRIEF DESCRIPTION OF THE DRAWINGS

Further advantages and features of the present invention become clear by means of the following description of an illumination system according to an embodiment of the present invention with reference to the attached drawings. These show as follows:

FIG. 3 a diagrammatic perspective view of an illumination system according to a second embodiment of the present invention; and FIG. 4 a diagrammatic perspective view of an illumination system according to a third embodiment of the present invention.

DETAILED DESCRIPTION OF PREFERRED EMBODIMENTS

Figure 1:
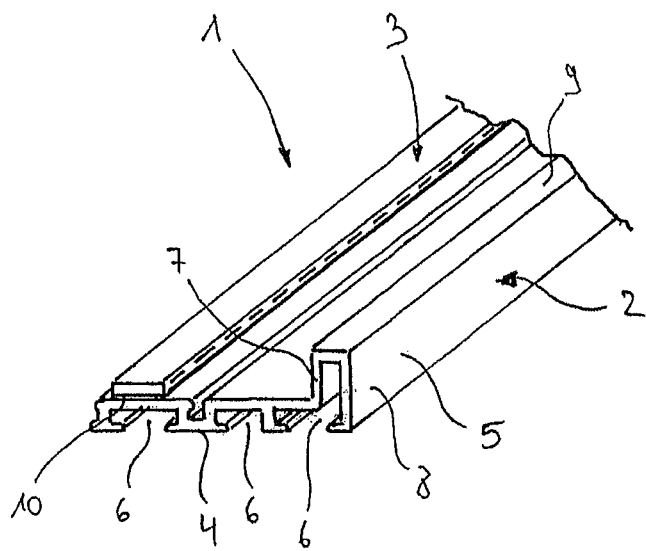
FIG. 1 a diagrammatic perspective view of an illumination system according to an embodiment of the present invention, and FIG. 2 a diagrammatic side view which shows the illumination system illustrated in FIG. 1 in the fitted state.

FIG. 1 shows an illumination system 1 according to an embodiment of the present invention. As main components the illumination system 1 comprises an elongate, substantially L-shaped profile 2 and an illuminant 3.

The profile 2 is an extruded profile that is produced from aluminum or stainless steel with a matte surface. Of course, other materials can basically also be used for the profile 2, such as for example plastic or the like. The profile 2 comprises a fastening section 4 and a limitation section 5 extending perpendicular to the latter, the fastening section 4 and the limitation section 5 being made in one part. The fastening section 4 is provided with a number of undercut cavities 6 on its bottom. Alternatively or in addition, there can also be fastened to the bottom of the fastening section 4 at least one fabric or fleece (not detailed here) that is designed such that it provides an adhesive base for an adhesive, such as for example a tile adhesive. The limitation section 5 has side walls 7 and 8 lying opposite one another which are connected to one another by a connection wall 9.

The illuminant 3 is an elongate strip with a plurality of LEDs arranged over the latter. The illuminant 3 is fastened to the top of the fastening section 4 of the profile 2 a distance away from the limitation section 5 using an adhesive strip 10 and is designed and positioned such that, in the correctly arranged state, it emits light in the direction of the limitation section 5.

Figure 2:
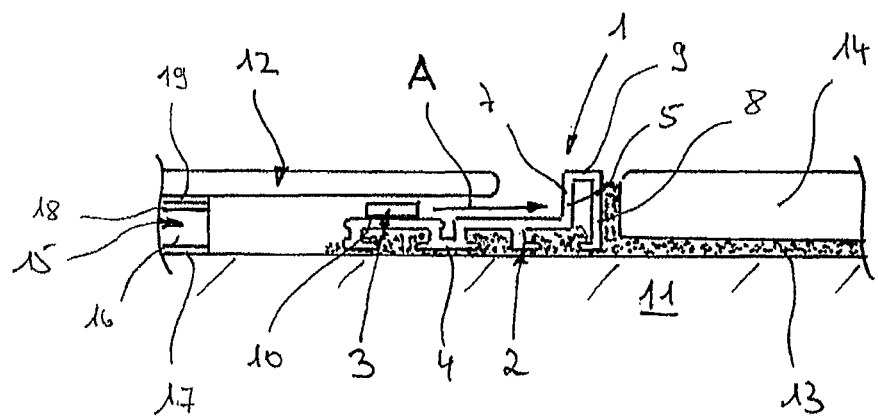

FIG. 2 shows the illumination system 1 illustrated in FIG. 1 in the fitted state in which it serves to define and provide all-round lighting for an object 12 positioned on a base 11, in this case a wall, said object being a rectangular mirror.

When fitting the illumination system 1 to the wall 11, the wall 11 is first of all covered with tiles 14 using a tile adhesive 13, the region in which the mirror 12 is to be positioned being recessed. In a further step, profiles 2 of the illumination system 1 are also fixed to the wall 11 adjacent to the tiles 14, likewise using tile adhesive 13, so that the profiles 2 surround the region in which the mirror 12 is subsequently to be positioned like a frame. For this purpose the profiles 2 can be cut to form miter joints in the corner regions so as to produce seamless and visually attractive cross-overs. Furthermore, the individual profiles 2 can be provided in the joint areas with connection elements (not detailed) and be fastened to one another, for which purpose the connection elements are inserted into the recesses 6 and fixed in the latter. As soon as the profile 2 is fixed to the wall 11 the illuminant 3 is cut to size and is stuck to the top of the fastening section 4 of the profile 2 a distance apart from the limitation section 5 using the adhesive strip 10. The mirror 12 is now fastened to the wall 11, for which purpose a number of spacing means 15 are used in this instance. Each spacing means 15 comprises a magnet 16. Positioned on one side of the magnet 16 is an adhesive strip 17 that is adhesive on both sides, with which the magnet 16 is fixed to the wall 11. A metal plate 18 is held on the other side of the magnet 16 by the magnetic force, and said metal plate is in turn fixed to the rear side of the mirror 12 by an adhesive strip 19 that is adhesive on both sides. By virtue of the spacing means 15 it is possible to position the mirror 12 such that it covers the illuminant positioned on the top of the fastening section 4 of the profile 2. For maintenance work the mirror 12 can be released from the wall 11 by breaking down the magnetic force of the respective magnet 16 of the spacing means 15 so that the illuminant 3 is freely accessible.

In the arrangement shown in FIG. 2 the connection wall 9 of the limitation section 5 and part of the top of the fastening section 4 form decorative surfaces visible from the outside. The matte surface of the side wall 7 is illuminated with light by the illuminant 3 in the direction of arrow A, by means of which visually attractive indirect all-round lighting of the mirror 12 is achieved. By virtue of the matte surface of the profile 2 the individual light spots emitted by the illuminant 3 are not visible to the eye.

It should be clear that the object 12 does not have to be a mirror, but other objects can also be defined and provided with all-round lighting by the illumination system 1 according to the invention.

FIG. 3 shows an illumination system 20 according to a second embodiment of the present invention. As main components the illumination system 20 comprises an elongate, substantially L-shaped profile 21, an elongate illuminant 22, an elongate diffusion disc element 23 and an elongate spacing means 24.

The profile 21 is an extruded profile produced from aluminum or stainless steel with a shiny surface. Of course other materials can basically also be used for the profile 21, such as for example plastic or the like. The profile 21 comprises a receiving section 25, a fastening section 26 arranged substantially flush with the latter and a limitation section 27 extending perpendicular to the fastening section 26, the sections 25, 26 and 27 being made in one piece. The spacing means 24 is positioned on the top of the receiving section 25. The spacing means comprises a magnet 28 which is fixed on its bottom to the top of the receiving section 25 by an adhesive strip 29 that is adhesive on both sides. A metal plate 30 is held on the top of the magnet 28 by the magnetic force, said metal plate in turn being able to be stuck to an object, such as for example to an object 12 of the type shown in FIG. 2, by an adhesive strip 31 that is adhesive on both sides. The fastening section 26 is provided on its bottom with a number of undercut cavities 32. Alternatively or in addition, there can also be fastened to the bottom of the fastening section 26 at least one fabric or fleece (not detailed here) which is designed such that it provides an adhesive base for an adhesive, such as for example a tile adhesive. There is provided on the top of the fastening section 26 a receiving groove 33 into which a holding protrusion 34 of the diffusion disc element 23 can be inserted at the side in order to fix the diffusion disc element 23 to the top of the fastening section 26 between the illuminant 22 and the limitation section 27. The limitation section 27 has side walls 35 and 36 lying opposite one another which are connected to one another by a connection wall 37.

The illuminant 22 is an elongate strip with a plurality of LEDs arranged over the latter. The illuminant 22 is fastened to the top of the fastening section 26 of the profile 21 a distance away from the limitation section 27 using an adhesive strip 38 and is designed and arranged such that, in the correctly arranged state, it emits light in the direction of the limitation section 27.

The fitting of the illumination system 20 takes place in substantially the same way as the fitting of the illumination system 1 described with reference to FIG. 2. Since the spacing means 23 is fastened to the profile 21 in the illumination system 20, said profile does not have to be fastened separately to the base 11, due to which one can cut down on procedural steps during the final fitting. It should be clear that, instead of a spacing means 23, a plurality of spacing means spaced apart from one another can also be provided which are fixed to the top of the fastening section 26 along the profile 2. Due to the fact that the profile 21 has a shiny surface, the light spots emitted by the illuminant 22 would normally respectively be reflected on the limitation section 27 and so be individually visible to the observer, and this is not always desirable with regard to the resulting appearance. In order to avoid this type of punctiform reflection the illumination system 20 has the diffusion disc element 23 which can optionally be arranged on the fastening section and provides even illumination of the limitation section 27.

FIG. 4 shows an illumination system 40 according to a third embodiment of the present invention. As its main components the illumination system 40 comprises an elongate, substantially L-shaped profile 41, and elongate illuminant 42, an elongate receiving profile 43 and an elongate spacing means 44.

The profile 41 is an extruded profile that is produced from aluminum or steel with a matte surface. Of course, other materials can basically also be used for the profile 41, such as for example plastic or the like. The profile 41 comprises a fastening section 45 and a limitation section 46 extending perpendicularly to the fastening section 45, sections 45 and 46 being made in one part. The fastening section 45 is provided on its bottom with a number of undercut cavities 47. Alternatively or in addition there can also be fastened to the bottom of the fastening section 45 at least one fabric or fleece (not detailed here) that is designed such that it provides an adhesive base for an adhesive, such as for example a tile adhesive. Provided on the top of the fastening section 45 is a receiving groove 48 into which, similarly to FIG. 3, a holding protrusion of a diffusion disc element can be inserted at the side in order to fix the diffusion disc element to the top of the fastening section 45 between the illuminant 42 and the limitation section 46, even if this is not shown here. An undercut connection groove 49 is provided on the fastening section 45 to the side. The limitation section 46 has side walls 50 and 51 lying opposite one another and which are connected to one another by a connection wall 52.

The illuminant 42 is an elongate strip with a plurality of LEDs arranged over the latter. The illuminant 42 is fastened to the top of the fastening section 45 of the profile 41 a distance away from the limitation section 46 using an adhesive strip 53 and is designed and arranged such that, in the correctly arranged state, it emits light in the direction of the limitation section 46.

The receiving profile 43 has at the side a connection protrusion 54 made to correspond to the connection groove 49 of the profile 41 and which can optionally be engaged with the connection groove 49 in order to connect the receiving profile 43 to the profile 41. Fastened to the bottom of the receiving profile 43 is a fleece or fabric 55 which serves as an adhesive base for an adhesive, such as for example a tile adhesive. Correspondingly, the receiving profile 49 can be fastened by means of the fleece or fabric 55 to a base. Positioned on the top of the receiving profile 49 is the spacing means 44. The spacing means 44 comprises a magnet 56 which is fixed on its bottom to the top of the receiving profile 49 by an adhesive strip 57 that is adhesive on both sides. A metal plate 58 is held on the top of the magnet 56 by the magnetic force, and said metal plate can in turn be stuck to an object by an adhesive strip 59 that is adhesive on both sides, such as for example to an object 12 of the type shown in FIG. 2.

| LIST OF REFERENCE NUMBERS | |
|---|---|
| 1 | illumination system |
| 2 | profile |
| 3 | illuminant |
| 4 | fastening section |
| 5 | limitation section |
| 6 | cavity |
| 7 | side wall |
| 8 | side wall |
| 9 | connection wall |
| 10 | adhesive strip |
| 11 | base |
| 12 | object |
| 13 | tile adhesive |
| 14 | tiles |
| 15 | spacing means |
| 16 | magnet |
| 17 | adhesive strip |
| 18 | metal plate |
| 19 | adhesive strip |
| 20 | illumination system |
| 21 | profile |
| 22 | illuminant |
| 23 | diffusion disc element |
| 24 | spacing means |
| 25 | receiving section |
| 26 | fastening section |
| 27 | limitation section |
| 28 | magnet |
| 29 | adhesive strip |
| 30 | metal plate |
| 31 | adhesive strip |
| 32 | adhesive space |
| 33 | receiving groove |
| 34 | holding protrusion |
| 35 | side wall |
| 36 | side wall |
| 37 | connection wall |
| 38 | adhesive strip |
| 40 | illumination system |
| 41 | profile |

LIST OF REFERENCE NUMBERS

| | |
|---|---|
| 42 | illuminant |
| 43 | receiving profile |
| 44 | spacing means |
| 45 | fastening section |
| 46 | limitation section |
| 47 | cavity |
| 48 | receiving groove |
| 49 | connection groove |
| 50 | side wall |
| 51 | side wall |
| 52 | connection wall |
| 53 | adhesive strip |
| 54 | connection protrusion |
| 55 | fleece or fabric |
| 56 | magnet |
| 57 | adhesive strip |
| 58 | metal plate |
| 59 | adhesive strip |

What is claimed is:

1. An illumination system (1; 20; 40) for defining and lighting around an object (12) positioned on a base (11) comprising
at least one elongate profile (2; 21; 41) that has a fastening section (4; 26; 45) and a limitation section (5; 27; 46) extending transversely to the fastening section, and at least one illuminant (3; 22; 42) that is fastened or can be fastened to the top of the fastening section (4; 26; 45) of the profile (2; 21; 41) a distance away from the limitation section (5; 27; 46) and is formed and positioned such that, in the correctly arranged state, it emits light in the direction of the limitation section (5; 27; 46); wherein
the fastening section (4; 26; 45) of the profile (2; 21; 41) is provided on its bottom with at least one undercut cavity (6; 32; 47).

2. The illumination system (1; 20; 40) according to claim 1, wherein the profile (2; 21; 41) is an extruded profile with a cross-section that remains the same over the entire length.

3. The illumination system (1; 20; 40) according to claim 1, wherein the profile (2; 21; 41) is produced from aluminum or stainless steel.

4. The illumination system (1; 20; 40) according to claim 1, wherein the profile (2; 41) has a surface with a matte appearance.

5. The illumination system (1; 20; 40) according to claim 1, wherein the limitation section (5; 27; 46) of the profile (2; 21; 41) has side walls (7, 8; 35, 36; 50, 51) lying opposite one another which are connected to one another by a connection wall (9; 37; 52), in the correctly arranged state the outer surface of the connection wall (9; 37; 52) forming a visible decorative surface.

6. The illumination system (1; 20; 40) according to claim 1, wherein the illuminant (3; 22; 42) is elongate in form, in particular in the form of a strip or a chain with a plurality of LEDs arranged over the latter.

7. The illumination system (1; 20; 40) according to claim 1, wherein the illuminant (3; 22; 42) is fastened or can be fastened to the top of the fastening section (4; 26; 45) using at least one adhesive strip (10; 38; 53).

8. The illumination system (20) according to claim 1, further comprising an elongate diffusion disc element (23) that, in the correctly arranged state of the illumination system (20) can be fixed to the top of the fastening section (26) between the illuminant (22) and the limitation section (27).

9. The illumination system (20) according to claim 8, wherein the diffusion disc element (23) is fixed to the fastening section (26) by a manually releasable snap-on connection.

10. The illumination system (1; 20; 40) according to claim 1, further comprising spacing means (15; 24; 44) which are designed such that they position the object to be defined and provided with all-round lighting in the correctly arranged state such that the object at least partially covers the fastening section (4; 26; 45) of the profile (2; 21; 41).

11. The illumination system (1; 20; 40) according to claim 10, wherein the spacing means (15; 24; 44) comprise at least one magnet (16; 28; 56) and at least one metal plate (18; 30; 58).

12. An illumination system for defining and lighting around an object positioned on a base, comprising at least one elongate profile that has a fastening section and a limitation section extending transversely to the fastening section, and at least one illuminant that is fastened or can be fastened to the top of the fastening section of the profile a distance away from the limitation section and is formed and positioned such that, in the correctly arranged state, it emits light in the direction of the limitation section; and
spacing means that position the object to be defined and provided with all-round lighting in the correctly arranged state such that the object at least partially covers the fastening section of the profile.

13. The illumination system according to claim 12, wherein the spacing means comprises at least one magnet and at least one metal plate.

14. The illumination system according to claim 12, wherein the fastening section of the profile is provided on its bottom with at least one undercut cavity.

15. The illumination system according to claim 1, wherein the illuminant is fastened or can be fastened to the top of the fastening section using at least one adhesive strip.

16. An illumination system for defining and lighting around an object positioned on a base, comprising
at least one elongate profile that has a fastening section and a limitation section extending transversely to the fastening section, and at least one illuminant that is fastened or can be fastened to the top of the fastening section of the profile a distance away from the limitation section and is formed and positioned such that, in the correctly arranged state, it emits light in the direction of the limitation section; wherein
the illuminant is fastenable to the top of the fastening section using at least one adhesive strip.

17. The illumination system according to claim 16, wherein the fastening section of the profile is provided on its bottom with at least one undercut cavity.

18. The illumination system according to claim 16, wherein the profile is an extruded profile with a cross-section that remains the same over the entire length.

19. The illumination system according to claim 16, wherein the profile is produced from aluminum or stainless steel.

* * * * *